E. RICHARDSON & P. HARKNESS.
Wind-Wheel and Watering-Apparatus.

No. 165,505.  Patented July 13, 1875.

WITNESSES:
C. Neveux
A. F. Terry

INVENTOR:
Ezra Richardson and
Porter Harkness
BY
ATTORNEYS.

UNITED STATES PATENT OFFICE.

EZRA RICHARDSON AND PORTER HARKNESS, OF NEW RUTLAND, ILLINOIS.

IMPROVEMENT IN WINDMILLS AND WATERING APPARATUS.

Specification forming part of Letters Patent No. 165,505, dated July 13, 1875; application filed May 1, 1875.

*To all whom it may concern:*

Be it known that we, EZRA RICHARDSON and PORTER HARKNESS, of New Rutland, in the county of La Salle and State of Illinois, have invented a new and Improved Combined Automatic Pumping and Watering Apparatus, of which the following is a specification:

The invention will first be fully described, and then pointed out in the claims.

Figure 3:
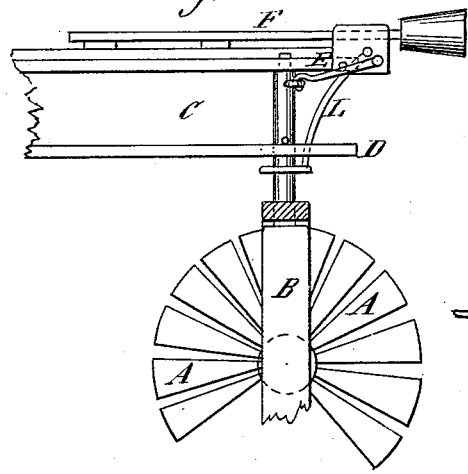
Figure 1:
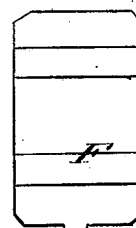
Figure 1:
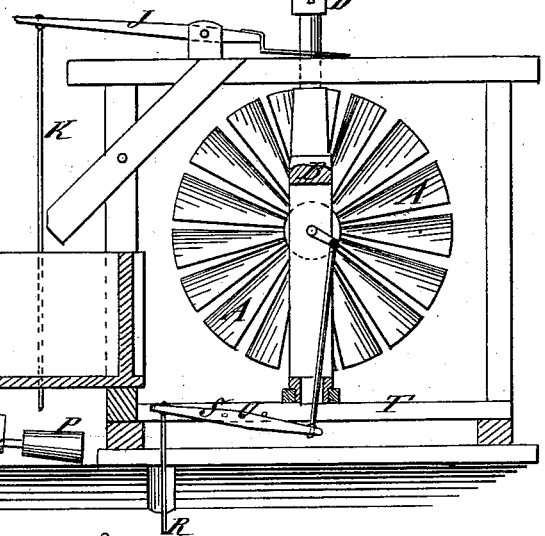
Figure 2:
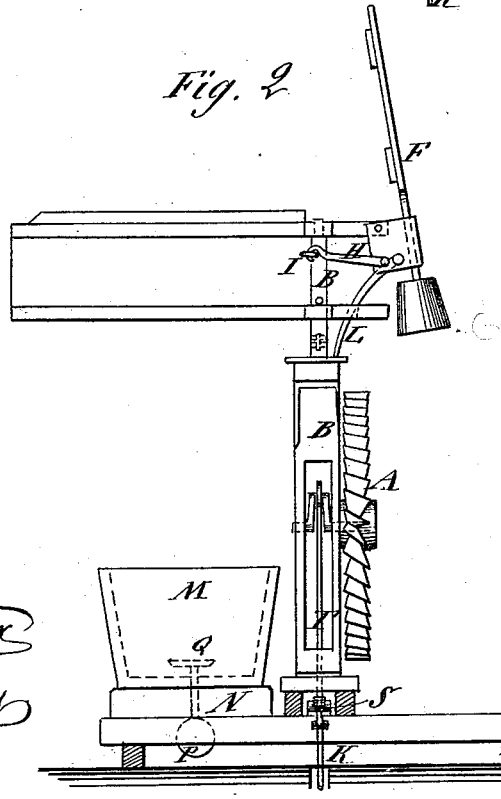

Figure 1 is a sectional elevation of our improved watering apparatus. Fig. 2 is a side elevation, and Fig. 3 is detail in side elevation and section.

Similar letters of reference indicate corresponding parts.

The wheel A has rigid vanes, and is mounted on the vertical shaft B, which turns horizontally, and carries the tail-vane C at its upper end, which is free to turn on the shaft. This vane has arms D E extending forward of the shaft, and on the outer end of the upper one the vane F is pivoted, so as to be held up with its face to the wind by a weight, G, which is attached to its lower end. The arm of this vane is also connected below the pivot, by a link, H, and an eyebolt, I, with the shaft B eccentrically, so that when the vane is forced down the wheel and the tail-vane will be turned into the same plane, and the wheel will be held by the tail-vane with its edge to the wind. The weight G is designed to be too heavy to be raised by light winds, which will not drive the wheel too fast, but is only to be raised by heavy winds to relieve and regulate the wheel. A lever, J, cord K, and a lifting-rod, L, are combined with the regulating-vane, so as to force it down by pulling on the rope to stop the wheel, when it may be required to do so. M is the main tank, into which the water flows, for holding a supply to last when the wind fails for days together, and N is the drinking-trough below it. This trough is suspended near one end on pivots O, and has a weight, P, at the extremity of the short end, while the other end is connected with the valve Q, through which the trough is supplied, so that when the trough is empty the weight will open the valve, and when it is filled the weight of the water will close it, and thus supply the trough with water as it is required, and without waste. R is the pump-rod, which is connected with the lever S, and the lever is connected to the pitman T of the crank-shaft, being swiveled to it, so that it may turn around freely with the wheel, and the lever is provided with a shifting pivot, U, to be employed for varying the throw of the pump in different seasons, as the winds vary in force.

Having thus described our invention, we claim as new and desire to secure by Letters Patent—

1. The combination of tail-vane C, having arms D E, pivoted vane F, weight G, link H, bolt I, and shaft B, as and for the purpose specified.

2. The weighted regulating-vane F, pivoted to the arm of the tail-vane, and connected eccentrically to the wheel-shaft, on which the tail-vane is free to turn, substantially as specified.

3. The combination of the weighted trough N and valve Q with the receiver M, substantially as specified.

EZRA RICHARDSON.
PORTER HARKNESS.

Witnesses:
WILLIAM W. TWIST,
JAS. RICHARDSON.